(12) United States Patent
Mukaiyama et al.

(10) Patent No.: US 6,220,704 B1
(45) Date of Patent: Apr. 24, 2001

(54) PROGRESSIVE POWER LENS

(75) Inventors: Hiroyuki Mukaiyama; Akira Komatsu, both of Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/485,573

(22) PCT Filed: Jun. 11, 1999

(86) PCT No.: PCT/JP99/03121

§ 371 Date: Feb. 14, 2000

§ 102(e) Date: Feb. 14, 2000

(87) PCT Pub. No.: WO99/64919

PCT Pub. Date: Dec. 16, 1999

(30) Foreign Application Priority Data

Jun. 12, 1998 (JP) .................................................. 10-165559

(51) Int. Cl.$^7$ ....................................................... G02C 7/06
(52) U.S. Cl. ................................................................ 351/169
(58) Field of Search ................................... 351/168, 169, 351/170, 171, 172, 177

(56) References Cited

FOREIGN PATENT DOCUMENTS

| | | |
|---|---|---|
| 2-39768 | 9/1990 | (JP) . |
| 3-46617 | 2/1991 | (JP) . |
| 6-337382 | 12/1994 | (JP) . |
| 10-123469 | 5/1998 | (JP) . |

*Primary Examiner*—Scott J. Sugarman
(74) *Attorney, Agent, or Firm*—Sughrue, Mion, Zinn, Macpeak & Seas, PLLC (57) ABSTRACT

An additional aspherical surface amount is defined by a sum of the optimum amount at a distance portion and the optimum amount at a near portion on a progressive refractive surface. Assuming that the ratio is taken as $\alpha:\beta$, the additional aspherical surface amount is added to the progressive refractive surface in such a manner that $\alpha$ and $\beta$ satisfy a relationship of $\alpha+\beta=1$. With this configuration, in the case where an aspherical shape is added to a progressive power lens for correcting visual acuity for the purpose of improving the optical performance and thinning the lens, the optimum aspherical shape can be given not only to a region along a main meridian line but also to the whole of the progressive refractive surface.

30 Claims, 5 Drawing Sheets

PROGRESSIVE POWER LENS

TECHNICAL FIELD

The present invention relates to a progressive power lens for correcting visual acuity, and particularly to a design of an aspherical progressive power lens intended to improve the optical performance of the lens and to thin the lens.

BACKGROUND ART

In recent years, various attempts have been made to improve the optical performances of progressive power lenses. In particular, attention is being given to a progressive power lens produced on the basis of aspherical design. This is intended to compensate for an error portion of a lens caused by spherical design by assuming a condition equivalent to an actual condition under which a user wears spectacles in each of which the lens is assembled, and calculating the dioptric power, astigmatism, prism, etc. of the lens by means of ray tracing.

A progressive refractive surface is originally formed by smoothly connecting spherical surfaces at distance and near portions, which are different in curvature, to each other within one surface, and therefore, it is naturally an aspherical surface. However, the wording "the aspherical design of a progressive power lens" used in this description means that even a point, having a specific curvature, of a progressive refractive surface, such as a distance optical center or near optical center is a aspherical surface.

A progressive power lens produced on the basis of such an aspherical design is disclosed in Japanese Patent Publication No. Tokko-hei 2-39768, which lens exhibits effects of reducing astigmatism and thinning the lens as compared with a lens produced on the basis of spherical design.

In the case of designing and producing a lens in accordance with the technique disclosed in Japanese Patent Publication No. Tokko-hei 2-39768, however, there occur several problems or insufficient points.

At first, Japanese Patent Publication No. Tokko-hei 2-39768 discloses the structure of only a region, in the vicinity of a main meridian line extending between distance and near portions, of the progressive power lens. The main meridian line of a progressive power lens is certainly as important as to be called a main convergence line; however, it is only a line. When acquiring viewing information, a human being takes a sight of a wide area other than the meridian line.

At second, since the dioptric power of a progressive power lens differs between different positions of the lens, an ideal additional aspherical surface amount added to an original progressive refractive surface must differ depending on a position of the lens. In accordance with the technique disclosed in Japanese Patent Publication No. Tokko-hei 2-39768, the additional aspherical surface amount differs between the distance and near portions disposed along the main meridian line; however, it is unclear what aspherical surface is set at other portions.

The region disposed along the main meridian line also includes a progressive portion in which a focal power is continuously changed, and it is theoretically required to give an additional aspherical surface amount to such a progressive portion. At the present day, however, any prior art intended to give an additional aspherical surface amount to the above progressive portion has been not disclosed.

The progressive surface of a progressive power lens is required to be configured such that refractive surfaces at all portions of the lens are optically continuous to each other within one surface. If a lens is configured such that although refractive surfaces at portions along the main meridian line form an optically continuous aspherical shape, the refractive surfaces at other portions not along the main meridian line do not form an optically continuous aspherical shape, it is useless to produce the lens on the basis of the aspherical design. As a method for forming the refractive surfaces at the portions not along the main meridian line into an optically continuous aspherical shape, there is known only a method of interpolating a curvature in the direction extending, perpendicular to the main meridian line, from each point of the optically continuous aspherical portion along the main meridian line. It is not regarded that such a method is able to form the portions not along the meridian line into an ideal aspherical shape.

The production of a custom-made progressive power lens for spectacles is required to simply form a progressive aspherical shape on the basis of the optimum aspherical design for achieving effects of reducing astigmatism in accordance with the user's recipe including the dioptric power of the lens and of thinning the lens.

In view of the foregoing, the present invention has been made, and an object of the present invention is to provide a progressive power lens in which all of portions including a progressive portion are formed into an optimum aspherical shape on the basis of a simple lens design.

DISCLOSURE OF INVENTION

To achieve the above object, the present invention provides a progressive power lens in which the optimum aspherical shape is given to the entire lens including a progressive portion by a lens design capable of simply forming a new progressive aspherical refractive shape on the basis of a progressive spherical refractive shape, or by a lens design capable of simply forming, on the basis of a progressive aspherical refractive shape adapted for a certain user's recipe, a new progressive aspherical refractive shape adapted for another desired user's recipe.

To be more specific, an additional aspherical surface amount for each user's recipe is not determined on the basis of ray tracing but is determined by a method wherein the optimum additional aspherical surface amount is previously determined by actual ray tracing for several examples selected from a range of user's recipes using a common basic progressive refractive surface, and then an additional aspherical surface amount for a desired user's recipe is determined by interpolation on the basis of the optimum additional aspherical surface amount.

The present invention provides a progressive power lens designed on the basis of the following five methods of calculating an additional aspherical surface amount.

According to a first invention there is provided a progressive power lens characterized in that at least one of two refractive surfaces forming a spectacle lens has a progressive refractive surface including a FL distance portion and a near portion having different focal powers, and a progressive portion having a focal power progressively changed between the distance and near portions; coordinates are defined such that, assuming that the progressive refractive surface of the lens assembled in each of spectacles is viewed from the front side of a user, the horizontal direction is taken as an X-axis; the vertical direction (direction between the distance and near portions) is taken as a Y-axis; the depth direction is taken as a Z-axis; and a progressively change starting point located at the lower end of the distance portion is taken as an origin $(x, y, z)=(0, 0, 0)$; assuming that a coordinate of an original progressive refractive surface is taken as $z_p$ and a coordinate of the progressive refractive surface is taken as $z_t$, a relationship of $z_t=z_p+\delta$ is established; and at the distance portion along a main meridian line extending substantially in the Y-axis direction of the progressive refractive surface, the $\delta$ is given by $\delta=g(r)$; at the near portion along the main meridian line extending substantially in the Y-axis direction of the progressive refractive surface, the d is given by $\delta=h(r)$; and at other portions, the $\delta$ is given by $\delta=\alpha \cdot g(r)+\beta \cdot h(r)$ where $\alpha$ and $\beta$ satisfy the relationship of $\alpha+\beta=1.0$, $0 \leq \alpha \leq 1$, and $0 \leq \beta \leq 1$; r is a distance from the progressively change starting point and is expressed by $r=(x^2+y^2)^{1/2}$; and the $g(r)$ and $h(r)$ are each a function depending only on r and satisfy the relationship of $g(r) \neq h(r)$ and $g(0)=0$.

According to a second invention, there is provided a progressive power lens characterized in that at least one of two refractive surfaces forming a spectacle lens has a progressive refractive surface including a distance portion and a near portion having different focal powers, and a progressive portion having a focal power progressively changed between the distance and near portions; coordinates are defined such that, assuming that the progressive refractive surface of the lens assembled in each of spectacles is viewed from the front side of a user, the horizontal direction is taken as an X-axis; the vertical direction (direction between the distance and near portions) is taken as a Y-axis; the depth direction is taken as a Z-axis; and a progressively change starting point located at the lower end of the distance portion is taken as an origin $(x, y, z)=(0, 0, 0)$; assuming that a radial inclination of an original progressive refractive surface is taken as $dz_p$ and a radial inclination of the progressive refractive surface is taken as $dz_t$, a relationship of $dz_t=dz_p+\delta$ is established; and at the distance portion along a main meridian line extending substantially in the Y-axis direction of the progressive refractive surface, the $\delta$ is given by $\delta=g(r)$; at the near portion along the main meridian line extending substantially in the Y-axis direction of the progressive refractive surface, the $\delta$ is given by $\delta=h(r)$; and at other portions, the $\delta$ is given by $\delta=\alpha \cdot g(r)+\beta \cdot h(r)$ where $\alpha$ and $\beta$ satisfy the relationship of $\alpha+\beta=1.0$, $0 \leq \alpha \leq 1$, and $0 \leq \beta \leq 1$; r is a distance from the progressively change starting point and is expressed by $r=(x^2+y^2)^{1/2}$; and the $g(r)$ and $h(r)$ are each a function depending only on r and satisfy the relationship of $g(r) \neq h(r)$ and $g(0)=0$.

According to a third invention, there is provided a progressive power lens characterized in that at least one of two refractive surfaces forming a spectacle lens has a progressive refractive surface including a distance portion and a near portion having different focal powers, and a progressive portion having a focal power progressively changed between the distance and near portions; coordinates are defined such that, assuming that the progressive refractive surface of the lens assembled in each of spectacles is viewed from the front side of a user, the horizontal direction is taken as an X-axis; the vertical direction (direction between the distance and near portions) is taken as a Y-axis; the depth direction is taken as a Z-axis; and a progressively change starting point located at the lower end of the distance portion is taken as an origin $(x, y, z)=(0, 0, 0)$; assuming that a radial curvature of an original progressive refractive surface is taken as $c_p$ and a radial curvature of the progressive refractive surface is taken as $c_t$, a relationship of $c_t=c_p+\delta$ is established; and at the distance portion along a main meridian line extending substantially in the Y-axis direction of the progressive refractive surface, the $\delta$ is given by $\delta=g(r)$; at the near portion along the main meridian line extending substantially in the Y-axis direction of the progressive refractive surface, the $\delta$ is given by $\delta=h(r)$; and at other portions, the $\delta$ is given by $\delta=\alpha \cdot g(r)+\beta \cdot h(r)$ where $\alpha$ and $\beta$ satisfy the relationship of $\alpha+\beta=1.0$, $0 \leq \alpha 1$, and $0 \leq \beta \leq 1$; r is a distance from the progressively change starting point and is expressed by $r=(x^2+y^2)^{1/2}$; and the $g(r)$ and $h(r)$ are each a function depending only on r and satisfy the relationship of $g(r) \neq h(r)$ and $g(0)=0$.

According to a fourth invention, there is provided a progressive power lens characterized in that at least one of two refractive surfaces forming a spectacle lens has a progressive refractive surface including a distance portion and a near portion having different focal powers, and a progressive portion having a focal power progressively changed between the distance and near portions; coordinates are defined such that, assuming that the progressive refractive surface of the lens assembled in each of spectacles is viewed from the front side of a user, the horizontal direction is taken as an X-axis; the vertical direction (direction between the distance and near portions) is taken as a Y-axis; the depth direction is taken as a Z-axis; and a progressively change starting point located at the lower end of the distance portion is taken as an origin $(x, y, z)=(0, 0, 0)$; assuming that a coordinate of an original progressive refractive surface is taken as $z_p$, and a coordinate of the progressive refractive surface is taken as $z_t$, a relationship expressed by the following equation (2) using $b_p$ defined by the following equation (1) is established;

$$b_p = \frac{2z_p}{x^2 + y^2 + z_p^2} \tag{1}$$

$$z_t = \frac{(b_p + \delta)r^2}{1 + \sqrt{1 - (b_p + \delta)^2 r^2}} \tag{2}$$

at the distance portion along a main meridian line extending substantially in the Y-axis direction of the progressive refractive surface, the $\delta$ is given by $\delta=g(r)$; at the near portion along the main meridian line extending substantially in the Y-axis direction of the progressive refractive surface, the $\delta$ is given by $\delta=h(r)$; and at other portions, the $\delta$ is given by $\delta=\alpha \cdot g(r)+\beta \cdot h(r)$ where $\alpha$ and $\beta$ satisfy the relationship of $\alpha+\beta=1.0$, $0 \leq \alpha \leq 1$, and $0 \leq \beta \leq 1$; r is a distance from the progressively change starting point and is expressed by $r=(X^2+y^2)^{1/2}$; and the $g(r)$ and $h(r)$ are each a function depending only on r and satisfy the relationship of $g(r) \neq h(r)$ and $g(0)=0$.

According to a fifth invention, there is provided a progressive power lens characterized in that at least one of two refractive surfaces forming a spectacle lens is configured as a progressive refractive surface including a distance portion and a near portion having different focal powers, and a progressive portion in which a focal power is progressively changed between the distance and near portions; coordinates are defined such that, assuming that the progressive refractive surface of the lens assembled in each of spectacles is viewed from the front side of a user, the horizontal direction is taken as an X-axis; the vertical direction (direction between the distance and near portions) is taken as a Y-axis; the depth direction is taken as a Z-axis; and a progressively change starting point located at the lower end of the distance portion is taken as an origin $(x, y, z)=(0, 0, 0)$; assuming that a coordinate of an original progressive refractive surface is taken as $z_p$, and a coordinate of the progressive refractive surface is taken as $z_t$, a relationship expressed by the following equation (3) using $b_p$ defined by the following equation (1) is established;

$$b_p = \frac{2z_p}{x^2 + y^2 + z_p^2} \quad (1)$$

$$z_t = \frac{b_p r^2}{1 + \sqrt{1 - (1+\delta)b_p^2 r^2}} \quad (3)$$

at the distance portion along a main meridian line extending substantially in the Y-axis direction of the progressive refractive surface, the $\delta$ is given by $\delta = g(r)$; at the near portion along the main meridian line extending substantially in the Y-axis direction of the progressive refractive surface, the $\delta$ is given by $\delta = h(r)$; and at other portions, the $\delta$ is given by $\delta = \alpha \cdot g(r) + \beta \cdot h(r)$ where $\alpha$ and $\beta$ satisfy the relationship of $\alpha + \beta 1.0$, $0 \leq \alpha \leq 1$, and $0 \leq \beta \leq 1$; r is a distance from the progressively change starting point and is expressed by $r = (x^2 + y^2)^{1/2}$; and the g(r) and h(r) are each a function depending only on r and satisfy the relationship of $g(r) \neq h(r)$ and $g(0) = 0$.

With respect to the above-described methods of calculating an additional aspherical surface amount, the additional aspherical surface amount can be smoothly given over the entire progressive refractive surface by interpolating, in accordance with an angle at the progressively change starting point, distributions of the ratio $\alpha$ of the optimum additional aspherical surface amount g(r) at the distance portion and the ratio $\beta$ of the optimum additional aspherical surface amount h(r) at the near portion.

According to a sixth invention, there is provided a progressive power lens according to any one of the first to fifth inventions, wherein an angle formed between a straight line extending from the progressively change starting point to the outer peripheral portion of the progressive refractive surface and the X-axis is taken as w, the $\alpha$ and $\beta$ satisfy the following equations (4) and (5):

$$\alpha = 0.5 + 0.5 \sin(w) \quad (4)$$

$$\beta = 0.5 - 0.5 \sin(w) \quad (5)$$

Upon determination of an additional aspherical surface amount by interpolation, if an additional aspherical surface amount itself is interpolated, the calculation becomes complicated because of a large amount of data. To cope with such an inconvenience, there may be adopted a method in which functions each defining a distribution of additional aspherical surface amount are prepared, and coefficients determining the functions are interpolated for each user's recipe. This is effective to significantly reduce the calculation amount, and hence to simplify the lens design.

According to a seventh invention, there is provided a progressive power lens according to any one of the first to fifth inventions, wherein the g(r) and h(r) satisfy the following equations (6) and (7):

$$g(r) = \sum_n G_n \cdot (r - r_0)^n \quad (6)$$

$$h(r) = \sum_n H_n \cdot (r - r_0)^n \quad (7)$$

where $G_n$ and $H_n$ are coefficients for determining g(r) and h(r), which are constants not depending on r for a certain progressive refractive surface; and n is an integer of 2 or more.

Further, in consideration of a dioptric power measurement point by a lensmeter, a circular portion having a specific radius $r = r_0$ centered at the progressively change starting point may be preferably made configured as a spherical design portion without addition of any additional aspherical surface amount. When $r_0 < r$, the additional aspherical surface amount may be preferably given by polynomial expressions shown in the above-described equations (6) and (7). The specific distance $r_0$ may be preferably in a range capable of covering the dioptric power measurement point, concretely, in a range of 7 mm or more and less than 12 mm.

According to an eighth invention, there is provided a progressive power lens according to any of the first to fifth inventions, wherein when $0 \leq r \leq r_0$, g(r) and h(r) satisfy the relationship of $g(0) = 0$ and $h(0) = 0$, and when $r_0 < r$, g(r) and h(r) satisfy the following equations (6) and (7):

$$g(r) = \sum_n G_n \cdot (r - r_0)^n \quad (6)$$

$$h(r) = \sum_n H_n \cdot (r - r_0)^n \quad (7)$$

where $G_n$ and $H_n$ are coefficients for determining g(r) and h(r), which are constants not depending on r for a certain progressive refractive surface; and n is an integer of 2 or more.

According to a ninth invention, there is provided a progressive power lens according to the eighth invention, wherein the $r_0$ is 7 mm or more and less than 12 mm.

By providing the progressive refractive surface on the eye side, it is possible to reduce the image jump and aberration which are drawbacks of the progressive power lens.

According to a tenth invention, there is provided a progressive power lens according to any one of first to ninth inventions, wherein the progressive refractive surface is provided on the eye side.

BRIEF DESCRIPTION OF DRAWINGS

FIGS. 1(a) and 1(b) show coordinates of a progressive power lens in which a progressive refractive surface is disposed on the outer surface, wherein

FIGS. 6(a) and 6(b) show coordinates of a progressive power lens in which a progressive refractive surface is arranged on the inner surface, wherein

BEST MODE FOR CARRYING OUT THE INVENTION

Hereinafter, embodiments of a progressive power lens according to the present invention will be described. The progressive power lens of the present invention used for correcting visual acuity includes two refractive surfaces, on an object side and an eye side, forming a spectacle lens, wherein at least one of these refractive surfaces is configured as a progressive refractive surface having a distance portion and a near portion which are different in focal power from each other, and a progressive portion in which the focal power is progressively changed between the distance and near portions. The progressive refractive surface is obtained by simply forming a new progressive refractive shape by an aspherical design on the basis of a progressive refractive shape formed by a spherical design, or simply forming, on the basis of a progressive refractive shape formed by an aspherical design adapted for a certain user's recipe, a new progressive refractive shape by an aspherical design optimum to another desired user's recipe.

According to the present invention, particularly, an additional aspherical surface amount to be added to an aspherical progressive power lens can be optimized for each user's recipe, and on the basis of the optimum additional aspherical surface amount, the optimum progressive refractive shape can be usually obtained by a simple calculating method. The method of the present invention, therefore, is suitable for production on order.

Figure 1:
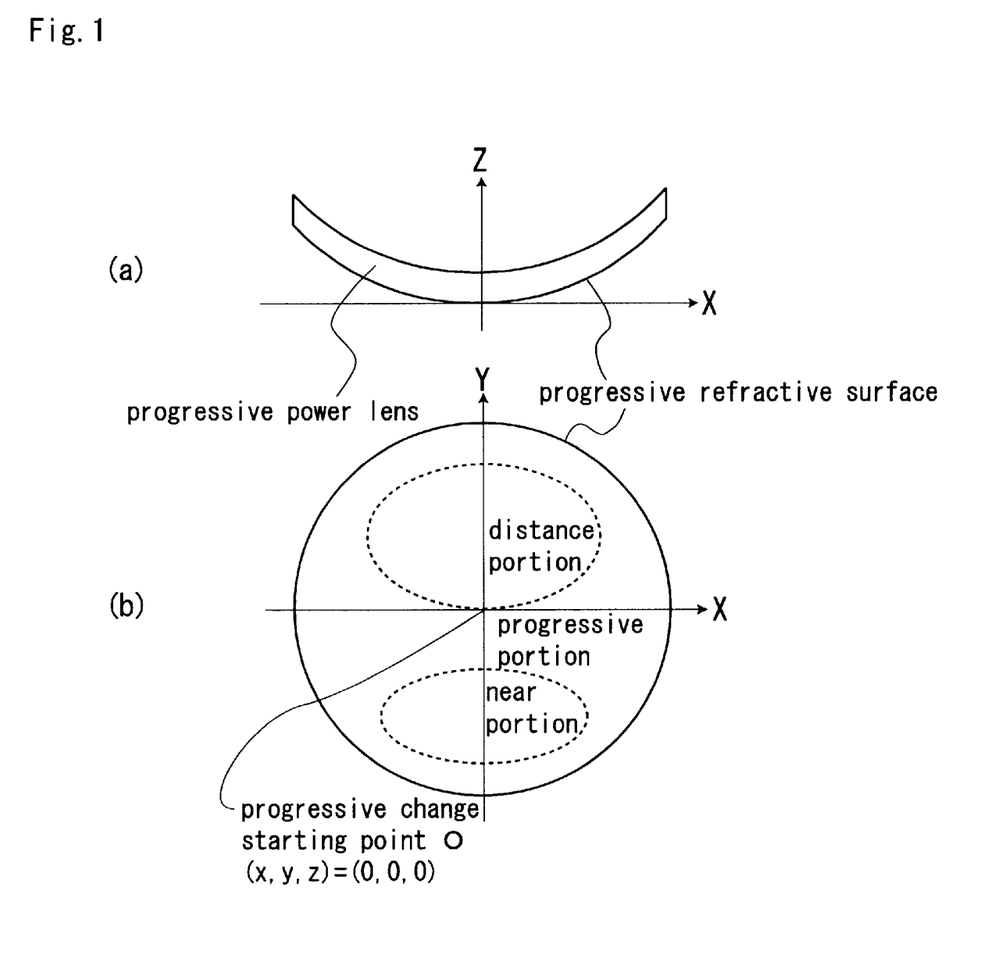
FIG. 1(a) is a sectional view taken on surfaces along X–Z axes passing through a progressively change starting point.
FIG. 1(b) is a front view.

Referring to FIGS. 1(a) and 1(b), coordinates of a progressive power lens are defined such that assuming that the progressive refractive surface of the lens assembled in each of spectacles is viewed from the front side of the user, the horizontal direction is taken as an X-axis; the vertical direction (direction between distance and near portions) is taken as a Y-axis; the depth direction is taken as a Z-axis; and a progressively change starting point O located at the lower end of the distance portion is taken as an origin, that is, (x, y, z)=(0, 0, 0).

According to the present invention, as described above, an additional aspherical surface amount for each user's recipe is not determined on the basis of ray tracing but is determined by a method wherein the optimum additional aspherical surface amount is previously determined by actual ray tracing for several examples selected from a range of user's recipes using a common basic progressive refractive surface, and then a new additional aspherical surface amount for a desired user's recipe is determined by interpolation using a function defining a distribution of additional aspherical surface amounts prepared on the basis of the optimum additional aspherical surface amount. The additional aspherical surface amount is calculated in accordance with the following five calculating methods:

The first method of calculating an additional aspherical surface amount is to directly calculate the coordinate of the additional aspherical surface amount in the z-axis direction. An original coordinate $Z_p$ of a progressive refractive surface in the depth direction is expressed by a function of coordinates (x, y) as follows:

$Z_p = f(x, y)$

When an additional aspherical surface amount $\delta$ in the z-axis direction is added to $z_p$, assuming that a synthesized coordinate in the z-axis direction after addition of $\delta$, that is, a coordinate of a new progressive refractive surface is taken as $z_t$, the coordinate $z_t$ is expressed by $z_t = Z_p + \delta$ At this time, an additional aspherical surface amount added to a portion in the vicinity of the optical axis of the lens (in the vicinity of the progressively change starting point O) may be small because prism is small and astigmatism less occurs at such a portion; however, since light rays are made obliquely incident on a lens outer peripheral portion, astigmatism easily occurs thereat, and thereby an additional aspherical surface amount added to such a portion for correcting the astigmatism generally becomes large. The ideal additional aspherical surface amount actually added, which differs depending on the user's recipe (dioptric power of a lens), is changed in accordance with a distance r from the optical axis (progressively change starting point O). Consequently, the optimum additional aspherical surface amount $\delta$ becomes a function of the distance $r = (x^2 + y^2)^{1/2}$ from the progressively change starting point O.

Since the focal power of the progressive power lens differs between the distance and near portions, the optimum additional aspherical surface amount may be desirable to differ between the distance and near portions. Consequently, the additional coordinate $\delta$ at the distance portion and the near portion along the main meridian line extending substantially in the Y-axis direction of the progressive refractive surface satisfies the following conditions:

$\delta = g(r)$ $\delta = h(r)$ $\delta g(r) \neq h(r)$ where $g(0) = 0$ at the progressively change starting point O, and each of $g(r)$ and $h(r)$ is a function depending only on r.

In the progressive power lens of the present invention, the large or small relationship between the optimum additional aspherical surface amount $g(r)$ at the distance portion and the optimum additional aspherical surface amount $h(r)$ at the near portion differs depending on the recipe of the lens, and therefore, it is not specified. However, since within one progressive power lens, the dioptric power of the lens is generally in a range of the dioptric power for distance and the dioptric power for near vision, the additional aspherical component $\delta$ may be set in a range of $g(r)$ and $h(r)$. In this case, according to the present invention, a ratio between $g(r)$ and $h(r)$ is determined in accordance with a desired distance set for each portion of the progressive power lens. For example, at the distance portion, $\delta$ is determined by 100% of $g(r)$ and 0% of $h(r)$; at the near portion, $\delta$ is determined by 0% of $g(r)$ and 100% of $h(r)$; and at the progressive portion, $\delta$ is progressively changed from $g(r)$ to $h(r)$ for obtaining an optically continuous refractive shape. Accordingly, a portion at which $\delta$ is determined by 50% of $g(r)$ and 50% of $h(r)$ is present between the distance portion and the near portion.

Consequently, at a portion other than the distance and near portions along the meridian line extending substantially in the Y-axis direction of the progressive refractive surface of the progressive power lens, the additional aspherical surface amount $\delta$ has the following relationship:

$\delta = \alpha \cdot g(r) + \beta \cdot h(r)$
$\alpha + \beta = 1.0$
$0 \leq \alpha \leq 1$
$0 \leq \beta \leq 1$ By setting the values of α and β in accordance with a desired distance set for each arbitrary point of the progressive power lens, an ideal aspherical shape can be easily added to the original progressive refractive surface.

The first method of calculating an additional aspherical surface amount is advantageous in that since the coordinates can be directly determined, calculation can be easily performed.

The second method of calculating an additional aspherical surface amount is characterized in that assuming that a radial inclination of an original progressive refractive surface is taken as $dz_p$ and an inclination of a new progressive refractive surface is taken as $dz_t$, the relationship of $dz_t = dz_p + \delta$ is established. Like the first calculating method, an additional aspherical surface amount δ is $\delta = g(r)$ at the distance portion along the main meridian line extending substantially in the Y-axis direction of the progressive refractive surface; $\delta = h(r)$ at the near portion along the main meridian line extending substantially in the Y-axis direction of the progressive refractive surface; and $\delta = \alpha \cdot g(r) + \beta \cdot h(r)$ at other portions.

In the above equations, α and β satisfy the relationship of $\alpha + \beta = 1.0$, $0 \leq \alpha \leq 1$, and $0 \leq \beta \leq 1$; r is a distance from the progressively change starting point O and is expressed by $r = (x^2 + y^2)^{1/2}$; and g(r) and h(r) are each a function depending only on r and satisfy the relationship of $g(r) \neq h(r)$ and $g(0) = 0$.

The second method of calculating an additional aspherical surface amount, in which an additional aspherical surface amount is calculated on the basis of a distribution of inclinations, is advantageous in that the control of a prism amount can be easily performed. The Z-coordinate can be determined by integration based on the origin.

The third method of calculating an additional aspherical surface amount is characterized in that assuming that a radial curvature of an original progressive refractive surface is taken as $c_p$ and a curvature of a new progressive refractive surface is taken as $c_t$, the relationship of $c_t = c_p + \delta$ is established. An additional aspherical surface amount δ is $\delta = g(r)$ at the distance portion along the main meridian line extending substantially in the Y-axis direction of the progressive refractive surface; $\delta = h(r)$ at the near portion along the main meridian line extending substantially in the Y-axis direction of the progressive refractive surface; and $\delta = \alpha \cdot g(r) + \beta \cdot h(r)$ at other portions.

In the above equations, a and B satisfy the relationship of $\alpha + \beta = 1.0$, $0 \leq \alpha \leq 1$, and $0 \leq \beta \leq 1$; r is a distance from the progressively change starting point O and is expressed by $r = (x^2 + y^2)^{1/2}$; and g(r) and h(r) are each a function depending only on r and satisfy the relationship of $g(r) \neq h(r)$ and $g(0) = 0$.

The third method of calculating an additional aspherical surface amount, in which an additional aspherical surface amount is calculated on the basis of a distribution of curvatures, is advantageous in that the optical evaluation is simplified and the aspherical design is facilitated, to easily form an aspherical shape in accordance with a desired user's recipe. The Z-coordinate can be determined by integration based on the origin.

The fourth method of calculating an additional aspherical surface amount is characterized in that assuming that a coordinate of an original progressive refractive surface is taken as $z_p$; a coordinate of a new progressive refractive surface is taken as $z_t$; and a factor for converting a Z-coordinate of a progressive refractive surface into a curvature is defined as $b_p$ expressed the following equation (1), the relationship expressed by the following equation (2) is established.

$$b_p = \frac{2 z_p}{x^2 + y^2 + z_p^2} \quad (1)$$

$$z_t = \frac{(b_p + \delta) r^2}{1 + \sqrt{1 - (b_p + \delta)^2 r^2}} \quad (2)$$

An additional aspherical surface amount δ is $\delta = g(r)$ at the distance portion along the main meridian line extending substantially in the Y-axis direction of the progressive refractive surface; $\delta = h(r)$ at the near portion along the main meridian line extending substantially in the Y-axis direction of the progressive refractive surface; and $\delta = \alpha \cdot g(r) + \beta \cdot h(r)$ at other portions.

In the above equations, α and β satisfy the relationship of $\alpha + \beta = 1.0$, $0 \leq \alpha \leq 1$, and $0 \leq \beta \leq 1$; r is a distance from the progressively change starting point O and is expressed by $r = (x^2 + y^2)^{1/2}$; and g(r) and h(r) are each a function depending only on r and satisfy the relationship of $g(r) \neq h(r)$ and $g(0) = 0$.

The fourth method of calculating an additional aspherical surface amount, in which an additional aspherical surface amount is calculated on the basis of a distribution of curvatures, is advantageous in that the optical evaluation is simplified and the aspherical design is facilitated, to easily form an aspherical shape in accordance with a desired user's recipe, and further the Z-coordinate can be directly calculated without use of integration.

The fifth method of calculating an additional aspherical surface amount is characterized in that assuming that a coordinate of an original progressive refractive surface is taken as $z_p$; a coordinate of a new progressive refractive surface is taken as $z_t$; and a factor for converting a Z-coordinate of a progressive refractive surface into a curvature is defined as $b_p$ expressed the following equation (1), the relationship expressed by the following equation (3) is established.

$$b_p = \frac{2 z_p}{x^2 + y^2 + z_p^2} \quad (1)$$

$$z_t = \frac{b_p r^2}{1 + \sqrt{1 - (1 + \delta) b_p^2 r^2}} \quad (3)$$

An additional aspherical surface amount δ is $\delta = g(r)$ at the distance portion along the main meridian line extending substantially in the Y-axis direction of the progressive refractive surface; $\delta = h(r)$ at the near portion along the main meridian line extending substantially in the Y-axis direction of the progressive refractive surface; and $\delta = \alpha \cdot g(r) + \beta \cdot h(r)$ at other portions.

In the above equations, α and β satisfy the relationship of $\alpha + \beta = 1.0$, $0 \leq \alpha \leq 1$, and $0 \leq \beta \leq 1$; r is a distance from the progressively change starting point O and is expressed by $r = (x^2 + y^2)^{1/2}$; and g(r) and h(r) are each a function depending only on r and satisfy the relationship of $g(r) \neq h(r)$ and $g(0) = 0$.

The fifth method of calculating an additional aspherical surface amount is advantageous in that the design can be performed in such a manner as to make smooth the change in curvature, to form a natural progressive refractive shape without rapid change in dioptric power.

Figure 2:
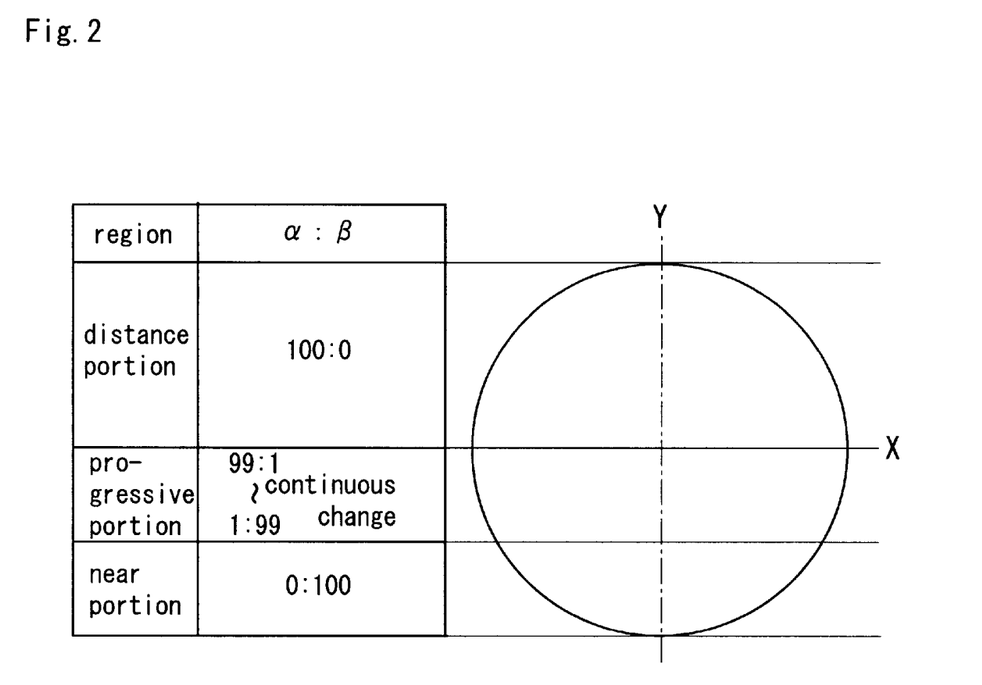
FIG. 2 is a front view of the progressive power lens of the present invention showing sections of a ratio between two kinds of additional aspherical surface components added in the progressive refractive surface.

The value α expressing the ratio of the optimum additional aspherical surface amount g(r) which is the additional aspherical surface amount δ at the distance portion, and the value β expressing the ratio of the optimum additional aspherical surface amount h(r) which is the additional aspherical surface amount δ at the near portion are interpolated as follows:

For example, as shown in FIG. 2, an original progressive refractive surface partitioned by straight lines into a distance portion, a progressive portion, and a near portion in such a manner that at the distance portion at which the ratio of g(r) is 100%, α:β=100:0 is given; at the near portion, α:β=0:100 is given; and at the progressive portion at which the focal power is changed, α:β is progressively changed in accordance with a desired distance.

Figure 3:
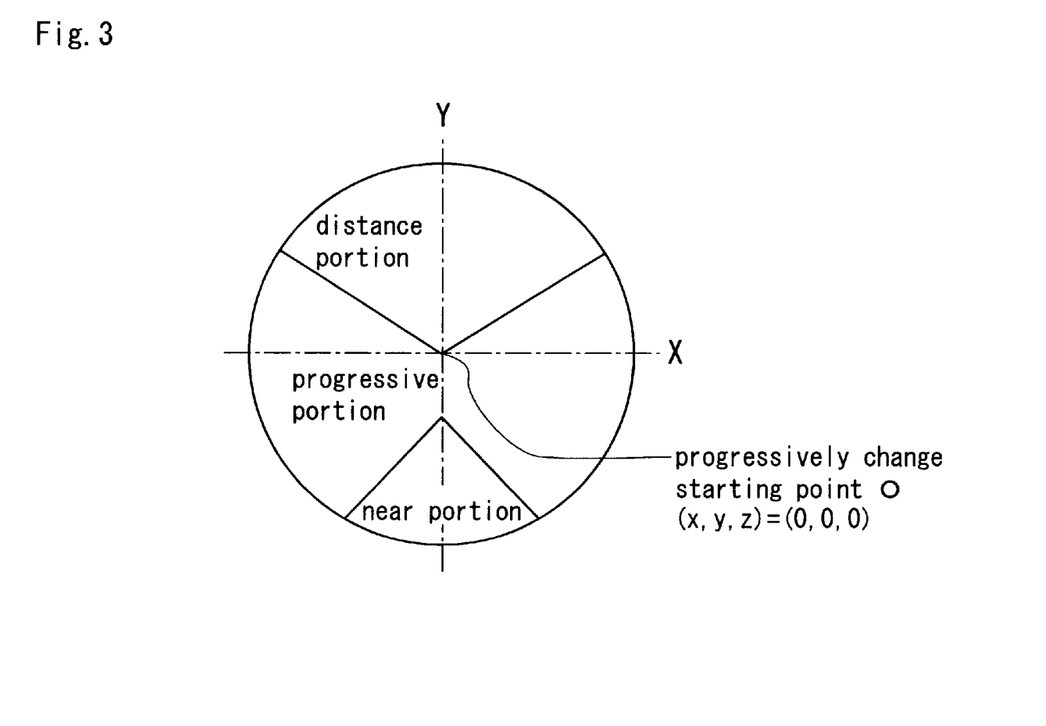
FIG. 3 is a front view of the progressive power lens showing sections of a ratio between two kinds of additional aspherical components added in the progressive refractive surface.

As shown in FIG. 3, an original progressive refractive surface is often partitioned by sectors substantially centered at the progressively change starting point O located at the lower end of the distance portion. In such a case, by determining the value of the additional aspherical far-vision/near-vision ratio α:β in accordance with the sector partition of the original progressive refractive surface, it is possible to effectively improve the optical performance and to effectively thin the lens.

Figure 4:
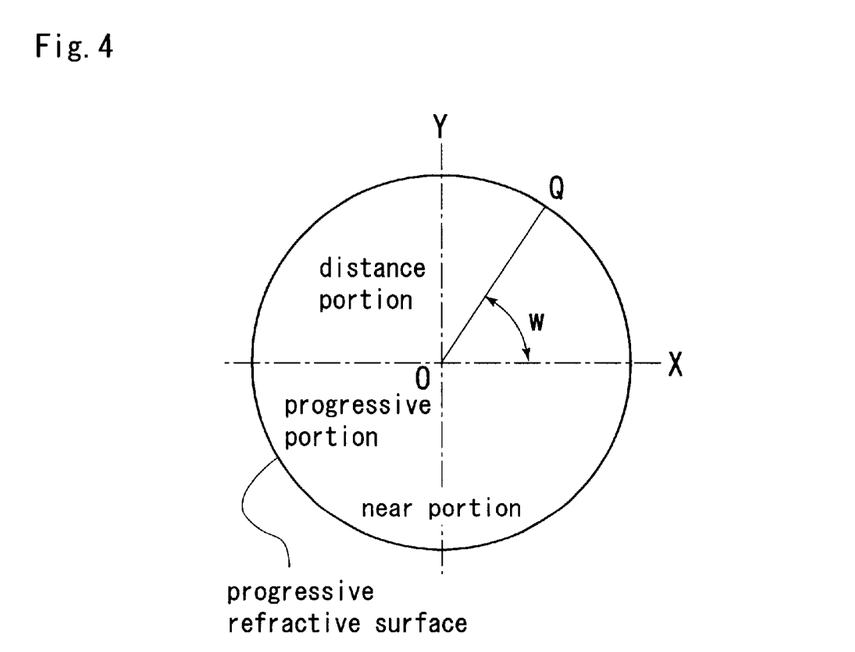
FIG. 4 is a front view showing coordinates of the progressive refractive surface of the progressive power lens of the present invention.

As shown in FIG. 4, assuming that an angle formed between a straight line OQ extending from the progressively change starting point O to the outer peripheral portion of a progressive refractive surface and the X-axis is taken as w, the values of α and β may be set to satisfy the following equations (4) and (5).

$$\alpha = 0.5 + 0.5 \sin(w) \quad (4)$$

$$\beta = 0.5 - 0.5 \sin(w) \quad (5)$$

By use of the values α and β thus set, a smooth additional aspherical surface component can be added to the entire area of the progressive refractive surface.

For example, as a result of calculating an additional aspherical surface component to be added to the distance portion along the main meridian line on the basis of the above equations, since w=90°, α=1 and β=0°, that is, only the additional aspherical surface component for distance (α) of 100% is given. For a portion along in the horizontal direction of the progressive power lens, since w=0 or w=180°, α=β0.5, that is, the additional aspherical surface component for distance (α) of 50% and the additional aspherical surface component for near vision (β) of 50% are given. Further, a change in additional aspherical surface component is smoothly shifted over the entire area of the progressive refractive surface.

The optimum additional aspherical surface amount g(r) at the distance portion and the optimum additional aspherical surface amount h(r) at the near portion may preferably satisfy the following equations (6) and (7) given as polynomial expressions of r:

$$g(r) = \sum_n G_n \cdot (r - r_0)^n \quad (6)$$

$$h(r) = \sum_n H_n \cdot (r - r_0)^n \quad (7)$$

In the above equations, $G_n$ and $H_n$ are coefficients for determining g(r) and h(r), which are constants not depending on r for a certain progressive refractive surface; and n is an integer of 2 or more.

Upon determination of an additional aspherical surface amount by interpolation, if an additional aspherical surface amount itself is interpolated, the calculation becomes complicated because of a large amount of data. To cope with such an inconvenience, there may be adopted a method in which the above functions g(r) and h(r) defining a distribution of additional aspherical surface amount are expressed by the above equations (6) and (7), and the coefficients $G_n$ and $H_n$ determining the functions are interpolated with respect to the same term n for each user's recipe. This is effective to significantly reduce the calculation amount, and hence to simplify the lens design.

Figure 5:
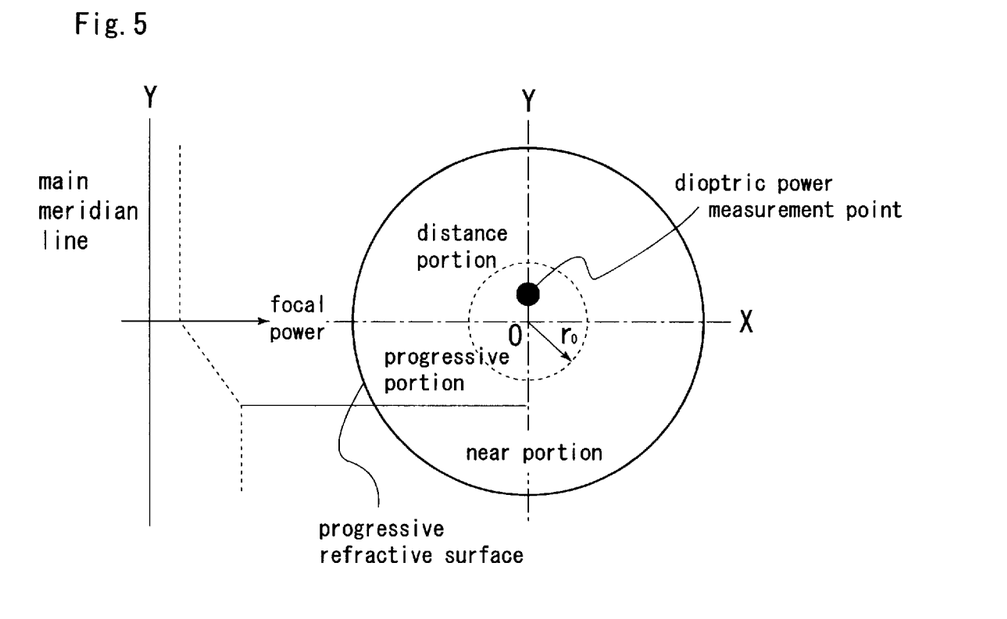
FIG. 5 is a front view showing a change in dioptric power along the main meridian line on the progressive refractive surface of the progressive power lens and a dioptric power measurement point.

Next, a progressive power lens produced in consideration of the dioptric power measured by using a lensmeter will be described. The dioptric power added to the progressive power lens is, as shown in FIG. 5, progressively changed from the progressively change starting point O. Accordingly, upon measurement of the dioptric power by the lensmeter, a dioptric power measurement point is generally set at a position offset 5–10 mm on the distance portion side from the progressively change starting point O in consideration of the width of a light ray emitted from the lensmeter. However, if the aspherical design is applied up to the vicinity of the progressively change starting point O, when the dioptric power is measured by the lensmeter, the dioptric power of the lens cannot be guaranteed because of occurrence of astigmatism.

To cope with such an inconvenience, as shown in FIG. 5, a circular portion having a specific radius $r=r_0$ centered at the progressively change starting point O may be preferably made configured as a spherical design portion without addition of any additional aspherical surface amount. To be more specific, when $0 \leq r \leq r_0$, the relationship of g(0)=0 and h(0)=0, that is, δ=0 may be given, and when $r_0 < r$, g(r) and h(r) may satisfy the above-described equations (6) and (7). The specific distance $r_0$ may be preferably in a range capable of covering the dioptric power measurement point, concretely, in a range of 7 mm or more and less than 12 mm.

The provision of such a spherical design portion does not particularly exert an effect to the optical performance because the vicinity of the progressively change starting point O is near the optical axis, and therefore, an ideal additional aspherical surface amount to be added thereto is essentially small.

While the several embodiments of the progressive power lens of the present invention have been described, the most suitable form of the progressive power lens of the present invention can be obtained by arranging the progressive refractive surface on the inner surface side, that is, on the refractive surface on the eye side.

By arranging the progressive refractive surface on the inner surface, the refractive surface on the outer surface side can be configured as a spherical surface. It is known that such a configuration is able to reduce the image jump and aberration which are drawbacks of the progressive power lens and hence to improve the optical performance (WO97/19382). If the present invention is applied to the progressive power lens in which the progressive refractive surface is arranged on the inner surface, there can be realized, in addition to the effect of reducing the image jump and aberration disclosed in WO97/19382, the effects of the present invention, that is, the reduction in astigmatism and thinning of the lens.

Figure 6:
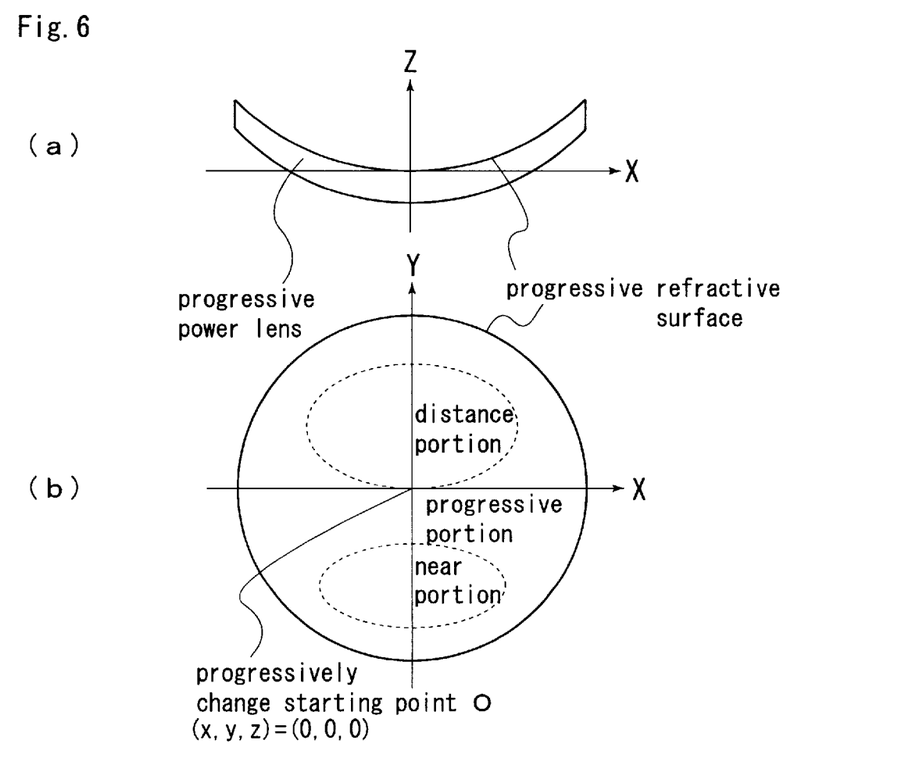
FIG. 6(a) is a sectional view taken on surfaces along X–Z axes passing through a progressively change starting point.
FIG. 6(b) is a front view.

To apply the present invention to the progressive refractive surface disclosed in WO97/19382, the coordinates shown in FIGS. 1(a) and 1(b) may be converted into those shown in FIGS. 6(a) and 6(b).

Further, to keep up with an astigmatic user's recipe, an aspherical surface may be added to a free curve surface obtained by synthesizing a progressive refractive surface and an astigmatic surface, which is disclosed in WO97/19382, in accordance with the above-described method.

To be more specific, a coordinate z at an arbitrary point P (x, y, z) on a surface on the eye side is expressed by the following equation (8) by using an approximate curvature Cp at the arbitrary point P on a progressive refractive surface formed by spherical design, and curvatures Cx and Cy in the x and y directions on a toric surface added to the progressive refractive surface formed by spherical design.

$$z = \frac{(Cp+Cx)x^2 + (Cp+Cy)y^2}{1+\sqrt{1-(Cp+Cx)^2 x^2 - (Cp+Cy)^2 y^2}} \quad (8)$$

In accordance with the method of the present invention, an additional aspherical surface amount may be added to a free curve surface obtained by synthesizing the progressive refractive surface calculated and an astigmatic surface by using the equation (8). In this case, it may be desirable to use the above-described fourth method of calculating an additional aspherical surface amount.

The application of the present invention to a progressive power lens in which the progressive refractive surface is arranged on the inner surface has further merit. In the case of a progressive power lens in which the progressive refractive surface is arranged on the outer surface, the addition power is guaranteed on the outer side, and the spherical power and astigmatic power are ensured by polishing the inner surface side at a specific curvature. Accordingly, although the inner surface side is formed into a shape which differs for each user, the progressive refractive surface on the outer side is formed into a shape which is made constant for each user insofar as the user's dioptric power is in a specific dioptric power range. As a result, the optimum aspherical surface cannot be added to the progressive refractive surface for each dioptric power. In other words, the constant aspherical surface must be added for the unsuitable dioptric power.

For a progressive power lens in which the progressive refractive surface is arranged on the inner surface, however, the spherical power, astigmatic power, and addition power, which differ for each user, can be determined only by setting the shape of the inner surface. The design for such a progressive power lens thus becomes a perfect custom-made design. As a result, an additional aspherical surface amount suitable for a predetermined recipe including the dioptric power can be added to the inner surface of the lens.

Figure 7:
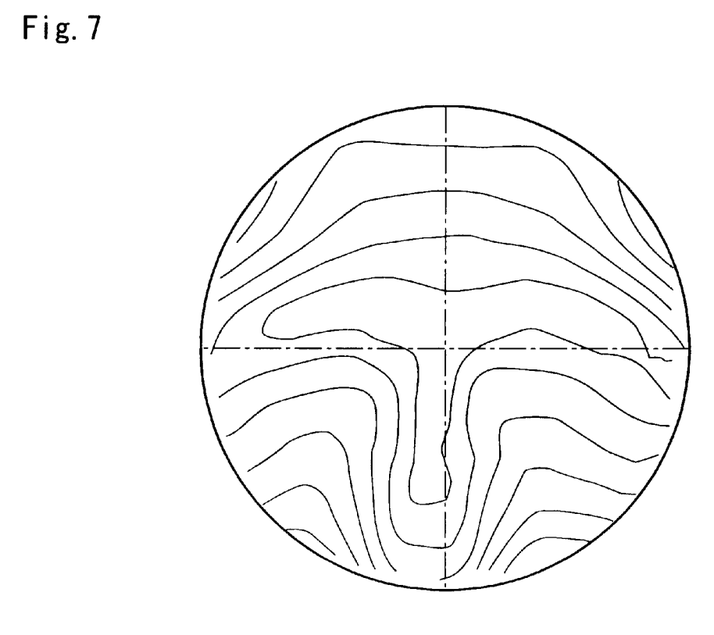
FIG. 7 is a front view of a progressive power lens showing a distribution of astigmatism of a progressive power lens in which a progressive refractive surface formed by spherical design is provided on the eye side.
Figure 8:
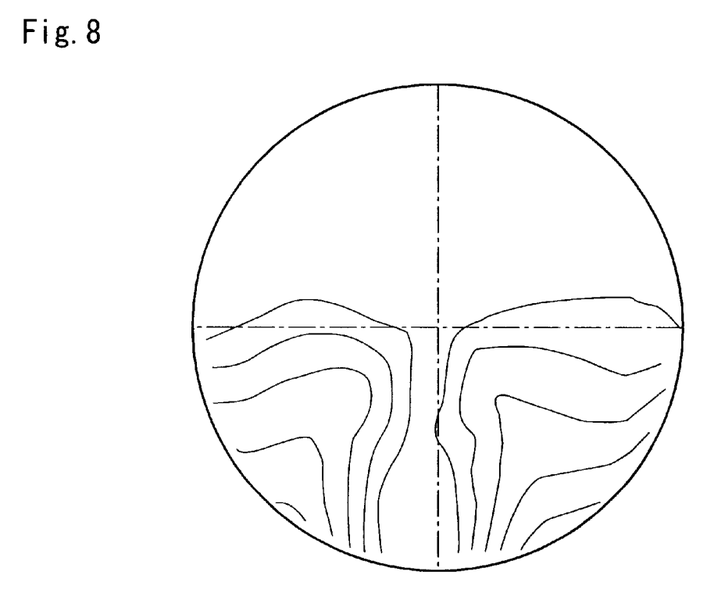
FIG. 8 is a front view of the progressive power lens of the present invention showing a distribution of astigmatism of a progressive power lens in which a progressive refractive surface formed by aspherical design is provided on the eye side.

Examples of the present invention will be described below. FIG. 7 shows a distribution of astigmatism of a spectacle lens produced by spherical design in which a progressive refractive surface is formed on the eye side in accordance with the recipe of S=+4.0 D, C=0 D, and the addition power is 2.0 D. FIG. 8 shows a distribution of astigmatism of a lens by aspherical design, modified from the lens shown in FIG. 7, in which an additional aspherical surface amount is added to the inner surface progressive lens in accordance with the present invention. As is apparent from these figures, the astigmatism is improved and thereby the optical performance is enhanced by the method of the present invention.

First Example

To obtain the inner surface progressive lens by aspherical design shown in FIG. 8, an additional aspherical surface amount is calculated in accordance with the first method of calculating an additional aspherical surface amount. In this case, g(r) and h(r) in the first calculating method are expressed by the polynomial expressions of r on the basis of the equations (6) and (7). Respective parameters of the equations (6) and (7) in this case are shown in Table 1. The radius $r_0$ of the spherical design portion is set at 10 mm.

TABLE 1

| Parameter | Value |
| --- | --- |
| $r_0$ | 10 |
| $G_4$ | 2.45E-06 |
| $G_6$ | −5.94E-09 |
| $G_8$ | 5.23E-12 |
| $H_4$ | 1.52E-06 |
| $H_6$ | −4.18E-09 |
| $H_8$ | 5.31E-12 |

By using the parameters shown in Table 1, the change in additional aspherical surface amount δ (unit: μm) is calculated depending on the values α and β expressed by the equations (4) and (5) as the functions of the angle w centered at the progressively change starting point O, and on the distance r from the progressively change starting point O and on the angle w centered at the progressively change starting point O. The result is shown in Table 2.

TABLE 2

| r\w | 0 | 30 | 60 | 90 | 120 | 150 | 180 | 210 | 240 | 270 | 300 | 330 | 360 |
| --- | --- | --- | --- | --- | --- | --- | --- | --- | --- | --- | --- | --- | --- |
| α | 0.500 | 0.750 | 0.933 | 1.000 | 0.933 | 0.750 | 0.500 | 0.250 | 0.067 | 0.000 | 0.067 | 0.250 | 0.500 |
| β | 0.500 | 0.250 | 0.067 | 0.000 | 0.067 | 0.250 | 0.500 | 0.750 | 0.933 | 1.000 | 0.933 | 0.750 | 0.500 |
| 10 | 0 | 0 | 0 | 0 | 0 | 0 | 0 | 0 | 0 | 0 | 0 | 0 | 0 |
| 11 | 0 | 0 | 0 | 0 | 0 | 0 | 0 | 0 | 0 | 0 | 0 | 0 | 0 |
| 12 | 0 | 0 | 0 | 0 | 0 | 0 | 0 | 0 | 0 | 0 | 0 | 0 | 0 |
| 13 | 0 | 0 | 0 | 0 | 0 | 0 | 0 | 0 | 0 | 0 | 0 | 0 | 0 |
| 14 | 0 | 1 | 1 | 1 | 1 | 1 | 0 | 0 | 0 | 0 | 0 | 0 | 0 |
| 16 | 2 | 3 | 3 | 3 | 3 | 3 | 2 | 2 | 2 | 2 | 2 | 2 | 2 |
| 17 | 4 | 5 | 5 | 5 | 5 | 5 | 4 | 4 | 3 | 3 | 3 | 4 | 4 |
| 18 | 7 | 8 | 8 | 9 | 8 | 8 | 7 | 6 | 5 | 5 | 5 | 6 | 7 |
| 19 | 11 | 12 | 13 | 13 | 13 | 12 | 11 | 9 | 8 | 8 | 8 | 9 | 11 |
| 20 | 15 | 17 | 19 | 19 | 19 | 17 | 15 | 13 | 12 | 12 | 12 | 13 | 15 |
| 21 | 21 | 24 | 26 | 26 | 26 | 24 | 21 | 19 | 17 | 16 | 17 | 19 | 21 |
| 22 | 28 | 32 | 34 | 35 | 34 | 32 | 28 | 25 | 22 | 21 | 22 | 25 | 28 |
| 23 | 37 | 41 | 44 | 46 | 44 | 41 | 37 | 32 | 29 | 28 | 29 | 32 | 37 |
| 24 | 46 | 52 | 56 | 57 | 56 | 52 | 46 | 40 | 36 | 35 | 36 | 40 | 46 |
| 25 | 56 | 63 | 68 | 70 | 68 | 63 | 56 | 50 | 45 | 43 | 45 | 50 | 56 |
| 26 | 68 | 76 | 81 | 83 | 81 | 76 | 68 | 60 | 54 | 52 | 54 | 60 | 68 |
| 27 | 80 | 89 | 95 | 98 | 95 | 89 | 80 | 72 | 65 | 63 | 65 | 72 | 80 |

TABLE 2-continued

| r\w | 0 | 30 | 60 | 90 | 120 | 150 | 180 | 210 | 240 | 270 | 300 | 330 | 360 |
|---|---|---|---|---|---|---|---|---|---|---|---|---|---|
| 28 | 94 | 104 | 110 | 113 | 110 | 104 | 94 | 85 | 78 | 76 | 78 | 85 | 94 |
| 29 | 110 | 119 | 126 | 129 | 126 | 119 | 110 | 101 | 94 | 92 | 94 | 101 | 110 |
| 30 | 129 | 137 | 143 | 146 | 143 | 137 | 129 | 120 | 114 | 112 | 114 | 120 | 129 |

Second Example

To obtain the inner surface progressive lens shown in FIG. 8, an additional aspherical surface amount is calculated in accordance with the second method of calculating an additional aspherical surface amount. In this case, g(r) and h(r) in the second calculating method are expressed by the polynomial expressions of r on the basis of the equations (6) and (7). Respective parameters of the equations (6) and (7) in this case are shown in table 3. The radius $r_0$ of the spherical design portion is set at 10 mm.

TABLE 3

| Parameter | Value |
|---|---|
| $r_0$ | 10 |
| $G_3$ | 9.80E-06 |
| $G_5$ | -3.56E-08 |
| $G_7$ | 4.22E-11 |
| $H_3$ | 6.10E-06 |
| $H_5$ | -2.51E-08 |
| $H_7$ | 4.25E-11 |

By using the parameters shown in Table 3, the change in additional aspherical surface amount δ (actual value multiplied by 10000) is calculated depending on the values α and β expressed by the equations (4) and (5) as the functions of the angle w centered at the progressively change starting point O, and on the distance r from the progressively change starting point O and on the angle w centered at the progressively change starting point O. The result is shown in Table 4.

Third Example

To obtain the inner surface progressive lens shown in FIG. 8, an additional aspherical surface amount is calculated in accordance with the third method of calculating an additional aspherical surface amount. In this case, g(r) and h(r) in the third calculating method are expressed by the polynomial expressions of r on the basis of the equations (6) and (7). Respective parameters of the equations (6) and (7) in this case are shown in Table 5. The radius $r_0$ of the spherical design portion is set at 10 mm.

TABLE 5

| Parameter | Value |
|---|---|
| $r_0$ | 10 |
| $G_2$ | 2.83E-05 |
| $G_4$ | -7.60E-08 |
| $G_6$ | 8.20E-11 |
| $H_2$ | 1.85E-05 |
| $H_4$ | -4.82E-08 |
| $H_6$ | 6.43E-11 |

By using the parameters shown in Table 5, the change in additional aspherical surface amount δ (actual value multiplied by 100000) is calculated depending on the values α and β expressed by the equations (4) and (5) as the functions of the angle w centered at the progressively change starting point O, and on the distance r from the progressively change starting point O and on the angle w centered at the progressively change starting point O. The result is shown in Table 6.

TABLE 4

| r\w | 0 | 30 | 60 | 90 | 120 | 150 | 180 | 210 | 240 | 270 | 300 | 330 | 360 |
|---|---|---|---|---|---|---|---|---|---|---|---|---|---|
| α | 0.500 | 0.750 | 0.933 | 1.000 | 0.933 | 0.750 | 0.500 | 0.250 | 0.067 | 0.000 | 0.067 | 0.250 | 0.500 |
| β | 0.500 | 0.250 | 0.067 | 0.000 | 0.067 | 0.250 | 0.500 | 0.750 | 0.933 | 1.000 | 0.933 | 0.750 | 0.500 |
| 10 | 0 | 0 | 0 | 0 | 0 | 0 | 0 | 0 | 0 | 0 | 0 | 0 | 0 |
| 11 | 0 | 0 | 0 | 0 | 0 | 0 | 0 | 0 | 0 | 0 | 0 | 0 | 0 |
| 12 | 1 | 1 | 1 | 1 | 1 | 1 | 1 | 1 | 0 | 0 | 0 | 1 | 1 |
| 13 | 2 | 2 | 2 | 3 | 2 | 2 | 2 | 2 | 2 | 2 | 2 | 2 | 2 |
| 14 | 5 | 5 | 6 | 6 | 6 | 5 | 5 | 4 | 4 | 4 | 4 | 4 | 5 |
| 15 | 9 | 10 | 11 | 11 | 11 | 10 | 9 | 8 | 7 | 7 | 7 | 8 | 9 |
| 16 | 15 | 17 | 18 | 19 | 18 | 17 | 15 | 13 | 12 | 11 | 12 | 13 | 15 |
| 17 | 23 | 25 | 27 | 28 | 27 | 25 | 23 | 20 | 18 | 17 | 18 | 20 | 23 |
| 18 | 32 | 36 | 38 | 39 | 38 | 36 | 32 | 28 | 25 | 24 | 25 | 28 | 32 |
| 19 | 42 | 47 | 51 | 52 | 51 | 47 | 42 | 37 | 33 | 32 | 33 | 37 | 42 |
| 20 | 53 | 60 | 65 | 67 | 65 | 60 | 53 | 47 | 42 | 40 | 42 | 47 | 53 |
| 21 | 65 | 73 | 79 | 81 | 79 | 73 | 65 | 57 | 51 | 49 | 51 | 57 | 65 |
| 22 | 77 | 86 | 93 | 96 | 93 | 86 | 77 | 68 | 61 | 58 | 61 | 68 | 77 |
| 23 | 89 | 99 | 107 | 110 | 107 | 99 | 89 | 78 | 70 | 67 | 70 | 78 | 89 |
| 24 | 100 | 111 | 119 | 122 | 119 | 111 | 100 | 88 | 80 | 77 | 80 | 88 | 100 |
| 25 | 110 | 121 | 130 | 133 | 130 | 121 | 110 | 99 | 91 | 88 | 91 | 99 | 110 |
| 26 | 121 | 131 | 139 | 141 | 139 | 131 | 121 | 111 | 103 | 101 | 103 | 111 | 121 |
| 27 | 133 | 141 | 147 | 149 | 147 | 141 | 133 | 126 | 120 | 118 | 120 | 126 | 133 |
| 28 | 149 | 153 | 156 | 157 | 156 | 153 | 149 | 146 | 143 | 142 | 143 | 146 | 149 |
| 29 | 172 | 170 | 169 | 168 | 169 | 170 | 172 | 175 | 176 | 177 | 176 | 175 | 172 |
| 30 | 207 | 196 | 188 | 185 | 188 | 196 | 207 | 218 | 226 | 229 | 226 | 218 | 207 |

TABLE 6

| r\w | 0 | 30 | 60 | 90 | 120 | 150 | 180 | 210 | 240 | 270 | 300 | 330 | 360 |
|---|---|---|---|---|---|---|---|---|---|---|---|---|---|
| α | 0.500 | 0.750 | 0.933 | 1.000 | 0.933 | 0.750 | 0.500 | 0.250 | 0.067 | 0.000 | 0.067 | 0.250 | 0.500 |
| β | 0.500 | 0.250 | 0.067 | 0.000 | 0.067 | 0.250 | 0.500 | 0.750 | 0.933 | 1.000 | 0.933 | 0.750 | 0.500 |
| 10 | 0 | 0 | 0 | 0 | 0 | 0 | 0 | 0 | 0 | 0 | 0 | 0 | 0 |
| 11 | 2 | 3 | 3 | 3 | 3 | 3 | 2 | 2 | 2 | 2 | 2 | 2 | 2 |
| 12 | 9 | 10 | 11 | 11 | 11 | 10 | 9 | 8 | 8 | 7 | 8 | 8 | 9 |
| 13 | 21 | 23 | 24 | 25 | 24 | 23 | 21 | 18 | 17 | 16 | 17 | 18 | 21 |
| 14 | 36 | 40 | 42 | 43 | 42 | 40 | 36 | 32 | 29 | 28 | 29 | 32 | 36 |
| 15 | 55 | 60 | 65 | 66 | 65 | 60 | 55 | 49 | 45 | 43 | 45 | 49 | 55 |
| 16 | 77 | 84 | 90 | 92 | 90 | 84 | 77 | 69 | 63 | 61 | 63 | 69 | 77 |
| 17 | 101 | 111 | 119 | 121 | 119 | 111 | 101 | 90 | 83 | 80 | 83 | 90 | 101 |
| 18 | 126 | 139 | 149 | 152 | 149 | 139 | 126 | 113 | 104 | 100 | 104 | 113 | 126 |
| 19 | 153 | 168 | 180 | 184 | 180 | 168 | 153 | 137 | 126 | 122 | 126 | 137 | 153 |
| 20 | 179 | 197 | 210 | 215 | 210 | 197 | 179 | 161 | 148 | 143 | 148 | 161 | 179 |
| 21 | 205 | 225 | 240 | 246 | 240 | 225 | 205 | 185 | 170 | 165 | 170 | 185 | 205 |
| 22 | 230 | 252 | 268 | 274 | 268 | 252 | 230 | 208 | 192 | 186 | 192 | 208 | 230 |
| 23 | 253 | 277 | 294 | 301 | 294 | 277 | 253 | 230 | 212 | 206 | 212 | 230 | 253 |
| 24 | 275 | 300 | 318 | 324 | 318 | 300 | 275 | 251 | 232 | 226 | 232 | 251 | 275 |
| 25 | 295 | 320 | 339 | 345 | 339 | 320 | 295 | 270 | 252 | 245 | 252 | 270 | 295 |
| 26 | 315 | 339 | 357 | 364 | 357 | 339 | 315 | 290 | 272 | 266 | 272 | 290 | 315 |
| 27 | 334 | 358 | 375 | 381 | 375 | 358 | 334 | 311 | 294 | 287 | 294 | 311 | 334 |
| 28 | 355 | 377 | 392 | 398 | 392 | 377 | 355 | 334 | 318 | 312 | 318 | 334 | 355 |
| 29 | 380 | 398 | 412 | 417 | 412 | 398 | 380 | 361 | 347 | 342 | 347 | 361 | 380 |
| 30 | 411 | 426 | 437 | 441 | 437 | 426 | 411 | 395 | 384 | 380 | 384 | 395 | 411 |

Fourth Example

To obtain the inner surface progressive lens shown in FIG. 8, an additional aspherical surface amount is calculated in accordance with the fourth method of calculating an additional aspherical surface amount. In this case, g(r) and h(r) in the fourth calculating method are expressed by the polynomial expressions of r on the basis of the equations (6) and (7). Respective parameters of the equations (6) and (7) in this case are shown in Table 7. The radius $r_0$ of the spherical design portion is set at 10 mm.

TABLE 7

| Parameter | Value |
|---|---|
| $r_0$ | 10 |
| $G_2$ | 2.31E-05 |
| $G_4$ | -5.00E-08 |

TABLE 7-continued

| Parameter | Value |
|---|---|
| $G_6$ | 4.35E-11 |
| $H_2$ | 1.63E-05 |
| $H_4$ | -4.24E-08 |
| $H_6$ | 5.41E-11 |

By using the parameters shown in Table 7, the change in additional aspherical surface amount δ (actual value multiplied by 100000) O is calculated depending on the values α and β expressed by the equations (4) and (5) as the functions of the angle w centered at the progressively change starting point O, and on the distance r from the progressively change starting point O and on the angle w centered at the progressively change starting point. The result is shown in Table 8.

TABLE 8

| r\w | 0 | 30 | 60 | 90 | 120 | 150 | 180 | 210 | 240 | 270 | 300 | 330 | 360 |
|---|---|---|---|---|---|---|---|---|---|---|---|---|---|
| α | 0.500 | 0.750 | 0.933 | 1.000 | 0.933 | 0.750 | 0.500 | 0.250 | 0.067 | 0.000 | 0.067 | 0.250 | 0.500 |
| β | 0.500 | 0.250 | 0.067 | 0.000 | 0.067 | 0.250 | 0.500 | 0.750 | 0.933 | 1.000 | 0.933 | 0.750 | 0.500 |
| 10 | 0 | 0 | 0 | 0 | 0 | 0 | 0 | 0 | 0 | 0 | 0 | 0 | 0 |
| 11 | 2 | 2 | 2 | 2 | 2 | 2 | 2 | 2 | 2 | 2 | 2 | 2 | 2 |
| 12 | 8 | 8 | 9 | 9 | 9 | 8 | 8 | 7 | 7 | 6 | 7 | 7 | 8 |
| 13 | 17 | 19 | 20 | 20 | 20 | 19 | 17 | 16 | 15 | 14 | 15 | 16 | 17 |
| 14 | 30 | 33 | 35 | 36 | 35 | 33 | 30 | 28 | 26 | 25 | 26 | 28 | 30 |
| 15 | 46 | 51 | 54 | 55 | 54 | 51 | 46 | 42 | 39 | 38 | 39 | 42 | 46 |
| 16 | 65 | 71 | 75 | 77 | 75 | 71 | 65 | 59 | 55 | 53 | 55 | 59 | 65 |
| 17 | 86 | 94 | 100 | 102 | 100 | 94 | 86 | 78 | 72 | 70 | 72 | 78 | 86 |
| 18 | 108 | 118 | 126 | 129 | 126 | 118 | 108 | 98 | 91 | 88 | 91 | 98 | 108 |
| 19 | 132 | 144 | 153 | 157 | 153 | 144 | 132 | 119 | 110 | 107 | 110 | 119 | 132 |
| 20 | 156 | 171 | 181 | 185 | 181 | 171 | 156 | 141 | 130 | 126 | 130 | 141 | 156 |
| 21 | 179 | 197 | 209 | 214 | 209 | 197 | 179 | 162 | 149 | 145 | 149 | 162 | 179 |
| 22 | 202 | 222 | 237 | 242 | 237 | 222 | 202 | 183 | 168 | 163 | 168 | 183 | 202 |
| 23 | 225 | 247 | 263 | 269 | 263 | 247 | 225 | 203 | 186 | 180 | 186 | 203 | 225 |
| 24 | 245 | 269 | 287 | 293 | 287 | 269 | 245 | 221 | 204 | 197 | 204 | 221 | 245 |
| 25 | 265 | 291 | 309 | 316 | 309 | 291 | 265 | 239 | 221 | 214 | 221 | 239 | 265 |
| 26 | 283 | 310 | 330 | 337 | 330 | 310 | 283 | 257 | 237 | 230 | 237 | 257 | 283 |

TABLE 8-continued

| r\w | 0 | 30 | 60 | 90 | 120 | 150 | 180 | 210 | 240 | 270 | 300 | 330 | 360 |
|---|---|---|---|---|---|---|---|---|---|---|---|---|---|
| 27 | 301 | 328 | 348 | 355 | 348 | 328 | 301 | 274 | 255 | 248 | 255 | 274 | 301 |
| 28 | 319 | 345 | 365 | 372 | 365 | 345 | 319 | 293 | 274 | 267 | 274 | 293 | 319 |
| 29 | 339 | 363 | 380 | 387 | 380 | 363 | 339 | 315 | 297 | 290 | 297 | 315 | 339 |
| 30 | 361 | 382 | 397 | 402 | 397 | 382 | 361 | 340 | 325 | 320 | 325 | 340 | 361 |

Fifth Example

To obtain the inner surface progressive lens shown in FIG. 8, an additional aspherical surface amount is calculated in accordance with the fifth method of calculating an additional aspherical surface amount. In this case, g(r) and h(r) in the fifth calculating method are expressed by the polynomial expressions of r on the basis of the equations (6) and (7). Respective parameters of the equations (6) and (7) in this case are shown in Table 9. The radius $r_0$ of the spherical design portion is set at 10 mm.

TABLE 9

| Parameter | Value |
|---|---|
| $r_0$ | 10 |
| $G_1$ | 0.783 |
| $G_3$ | -5.30E-04 |
| $H_1$ | 0.485 |
| $H_3$ | 5.34E-04 |

By using the parameters shown in Table 9, the change in additional aspherical surface amount δ (actual value) is calculated depending on the values α and β expressed by the equations (4) and (5) as the functions of the angle w centered at the progressively change starting point O, and on the distance r from the progressively change starting point O and on the angle w centered at the progressively change starting point O. The result is shown in Table 10.

TABLE 10

| r\w | 0 | 30 | 60 | 90 | 120 | 150 | 180 | 210 | 240 | 270 | 300 | 330 | 360 |
|---|---|---|---|---|---|---|---|---|---|---|---|---|---|
| α | 0.500 | 0.750 | 0.933 | 1.000 | 0.933 | 0.750 | 0.500 | 0.250 | 0.067 | 0.000 | 0.067 | 0.250 | 0.500 |
| β | 0.500 | 0.250 | 0.067 | 0.000 | 0.067 | 0.250 | 0.500 | 0.750 | 0.933 | 1.000 | 0.933 | 0.750 | 0.500 |
| 10 | 0.00 | 0.00 | 0.00 | 000 | 0.00 | 0.00 | 0.00 | 0.00 | 0.00 | 0.00 | 0.00 | 0.00 | 0.00 |
| 11 | 0.63 | 0.71 | 0.76 | 0.78 | 0.76 | 0.71 | 0.63 | 0.56 | 0.51 | 0.49 | 0.51 | 0.56 | 0.63 |
| 12 | 1.27 | 1.41 | 1.52 | 1.56 | 1.52 | 1.41 | 1.27 | 1.12 | 1.01 | 0.97 | 1.01 | 1.12 | 1.27 |
| 13 | 1.90 | 2.12 | 2.28 | 2.33 | 2.28 | 2.12 | 1.90 | 1.69 | 1.53 | 1.47 | 1.53 | 1.69 | 1.90 |
| 14 | 2.54 | 2.82 | 3.02 | 3.10 | 3.02 | 2.82 | 2.54 | 2.26 | 2.05 | 1.97 | 2.05 | 2.26 | 2.54 |
| 15 | 3.17 | 3.51 | 3.76 | 3.85 | 3.76 | 3.51 | 3.17 | 2.83 | 2.58 | 2.49 | 2.58 | 2.83 | 3.17 |
| 16 | 3.80 | 4.19 | 4.48 | 4.58 | 4.48 | 4.19 | 3.80 | 3.41 | 3.13 | 3.03 | 3.13 | 3.41 | 3.80 |
| 17 | 4.44 | 4.87 | 5.18 | 5.30 | 5.18 | 4.87 | 4.44 | 4.01 | 3.69 | 3.58 | 3.69 | 4.01 | 4.44 |
| 18 | 5.07 | 5.53 | 5.87 | 5.99 | 5.87 | 5.53 | 5.07 | 4.61 | 4.28 | 4.15 | 4.28 | 4.61 | 5.07 |
| 19 | 5.71 | 6.18 | 6.53 | 6.66 | 6.53 | 6.18 | 5.71 | 5.23 | 4.88 | 4.75 | 4.88 | 5.23 | 5.71 |
| 20 | 6.34 | 6.82 | 7.17 | 7.30 | 7.17 | 6.82 | 6.34 | 5.86 | 5.51 | 5.38 | 5.51 | 5.86 | 6.34 |
| 21 | 6.98 | 7.44 | 7.78 | 7.91 | 7.78 | 7.44 | 6.98 | 6.51 | 6.17 | 6.05 | 6.17 | 6.51 | 6.98 |
| 22 | 7.61 | 8.05 | 8.36 | 8.48 | 8.36 | 8.05 | 7.61 | 7.18 | 6.86 | 6.74 | 6.86 | 7.18 | 7.61 |
| 23 | 8.25 | 8.63 | 8.91 | 9.01 | 8.91 | 8.63 | 8.25 | 7.86 | 7.58 | 7.48 | 7.58 | 7.86 | 8.25 |
| 24 | 8.88 | 9.19 | 9.42 | 9.51 | 9.42 | 9.19 | 8.88 | 8.57 | 8.34 | 8.26 | 8.34 | 8.57 | 8.88 |
| 25 | 9.52 | 9.74 | 9.90 | 9.96 | 9.90 | 9.74 | 9.52 | 9.30 | 9.14 | 9.08 | 9.14 | 9.30 | 9.52 |
| 26 | 10.15 | 10.25 | 10.33 | 10.36 | 10.33 | 10.25 | 10.15 | 10.05 | 9.97 | 9.95 | 9.97 | 10.05 | 10.15 |
| 27 | 10.79 | 10.75 | 10.72 | 10.71 | 10.72 | 10.75 | 10.79 | 10.83 | 10.86 | 10.87 | 10.86 | 10.83 | 10.79 |
| 28 | 11.42 | 11.21 | 11.06 | 11.00 | 11.06 | 11.21 | 11.42 | 11.63 | 11.79 | 11.84 | 11.79 | 11.63 | 11.42 |
| 29 | 12.06 | 11.65 | 11.35 | 11.24 | 11.35 | 11.65 | 12.06 | 12.47 | 12.77 | 12.88 | 12.77 | 12.47 | 12.06 |
| 30 | 12.70 | 12.06 | 11.59 | 11.42 | 11.59 | 12.06 | 12.70 | 13.33 | 13.80 | 13.97 | 13.80 | 13.33 | 12.70 |

According to the progressive power lens of the present invention, the optimum aspherical component can be added over the entire area of the lens on the basis of a simple design, to realize improvement of the optical performance such as reduction in astigmatism and thinning of the lens.

INDUSTRIAL APPLICABILITY

The progressive power lens of the present invention is usable as a spectacle lens for correcting visual acuity, which includes a distance portion, a near portion, and a progressive portion therebetween.

What is claimed is:

1. A progressive power lens characterized in that at least one of two refractive surfaces forming a spectacle lens has a progressive refractive surface including a distance portion and a near portion having different focal powers, and a progressive portion having a focal power progressively changed between said distance and near portions;

coordinates are defined such that, assuming that said progressive refractive surface of the lens assembled in each of spectacles is viewed from the front side of a user, the horizontal direction is taken as an X-axis; the vertical direction (direction between said distance and near portions) is taken as a Y-axis; the depth direction is taken as a Z-axis; and a progressively change starting point located at the lower end of said distance portion is taken as an origin (x, y, z)=(0, 0, 0);

assuming that a coordinate of an original progressive refractive surface is taken as $z_p$ and a coordinate of said progressive refractive surface is taken as $z_t$, a relationship of $z_t = z_p + δ$ is established; and at said distance portion along a main meridian line extending substantially in the Y-axis direction of said progressive refractive surface, said $\delta$ is given by $\delta=g(r)$;

at said near portion along the main meridian line extending substantially in the Y-axis direction of said progressive refractive surface, said $\delta$ is given by $\delta=h(r)$; and at other portions, said $\delta$ is given by $\delta=\alpha \cdot g(r)+\beta \cdot h(r)$ where $\alpha$ and $\beta$ satisfy the relationship of $\alpha+\beta=1.0$, $0 \leq \alpha \leq 1$, and $0 \leq \beta \leq 1$; r is a distance from said progressively change starting point and is expressed by $r=(x^2+y^2)^{1/2}$; and said $g(r)$ and $h(r)$ are each a function depending only on r and satisfy the relationship of $g(r) \neq h(r)$ and $g(0)=0$.

2. A progressive power lens according to claim 1, wherein an angle formed between a straight line extending from the progressively change starting point to the outer peripheral portion of said progressive refractive surface and said X-axis is taken as w, said $\alpha$ and $\beta$ satisfy the following equations (4) and (5):

$$\alpha=0.5+0.5 \sin(w) \qquad (4)$$

$$\beta=0.5-0.5 \sin(w) \qquad (5).$$

3. A progressive power lens according to claim 1, wherein said $g(r)$ and $h(r)$ satisfy the following equations (6) and (7):

$$g(r) = \sum_{n} G_n \cdot (r - r_0)^n \qquad (6)$$

$$h(r) = \sum_{n} H_n \cdot (r - r_0)^n \qquad (7)$$

where $G_n$ and $H_n$ are coefficients for determining $g(r)$ and $h(r)$, which are constants not depending on r for a certain progressive refractive surface; and n is an integer of 2 or more.

4. A progressive power lens according to claim 1, wherein when $0 \leq r \leq r_0$, $g(r)$ and $h(r)$ satisfy the relationship of $g(0)=0$ and $h(0)=0$, and when $r_0<r$, $g(r)$ and $h(r)$ satisfy the following equations (6) and (7):

$$g(r) = \sum_{n} G_n \cdot (r - r_0)^n \qquad (6)$$

$$h(r) = \sum_{n} H_n \cdot (r - r_0)^n \qquad (7)$$

where $G_n$ and $H_n$ are coefficients for determining $g(r)$ and $h(r)$, which are constants not depending on r for a certain progressive refractive surface; and n is an integer of 2 or more.

5. A progressive power lens according to claim 4, wherein said $r_0$ is 7 mm or more and less than 12 mm.

6. A progressive power lens according to claim 1, wherein said progressive refractive surface is provided on the eye side.

7. A progressive power lens characterized in that at least one of two refractive surfaces forming a spectacle lens has a progressive refractive surface including a distance portion and a near portion having different focal powers, and a progressive portion having a focal power progressively changed between said distance and near portions;

coordinates are defined such that, assuming that said progressive refractive surface of the lens assembled in each of spectacles is viewed from the front side of a user, the horizontal direction is taken as an X-axis; the vertical direction (direction between said distance and near portions) is taken as a Y-axis; the depth direction is taken as a Z-axis; and a progressively change starting point located at the lower end of said distance portion is taken as an origin $(x, y, z)=(0, 0, 0)$;

assuming that a radial inclination of an original progressive refractive surface is taken as $dz_p$ and a radial inclination of said progressive refractive surface is taken as $dz_r$, a relationship of $dz_r=dz_p+\delta$ is established; and at said distance portion along a main meridian line extending substantially in the Y-axis direction of said progressive refractive surface, said $\delta$ is given by $\delta=g(r)$;

at said near portion along the main meridian line extending substantially in the Y-axis direction of said progressive refractive surface, said $\delta$ is given by $\delta=h(r)$; and at other portions, said $\delta$ is given by $\delta=\alpha \cdot g(r)+\beta \cdot h(r)$ where $\alpha$ and $\beta$ satisfy the relationship of $\alpha+\beta=1.0$, $0 \leq \alpha \leq 1$, and $0 \leq \beta \leq 1$; r is a distance from said progressively change starting point and is expressed by $r=(x^2+y^2)^{1/2}$; and said $g(r)$ and $h(r)$ are each a function depending only on r and satisfy the relationship of $g(r) \neq h(r)$ and $g(0)=0$.

8. A progressive power lens according to claim 7, wherein an angle formed between a straight line extending from the progressively change starting point to the outer peripheral portion of said progressive refractive surface and said X-axis is taken as w, said $\alpha$ and $\beta$ satisfy the following equations (4) and (5):

$$\alpha=0.5+0.5 \sin(w) \qquad (4)$$

$$\beta=0.5-0.5 \sin(w) \qquad (5).$$

9. A progressive power lens according to claim 7, wherein said $g(r)$ and $h(r)$ satisfy the following equations (6) and (7):

$$g(r) = \sum_{n} G_n \cdot (r - r_0)^n \qquad (6)$$

$$h(r) = \sum_{n} H_n \cdot (r - r_0)^n \qquad (7)$$

where $G_n$ and $H_n$ are coefficients for determining $g(r)$ and $h(r)$, which are constants not depending on r for a certain progressive refractive surface; and n is an integer of 2 or more.

10. A progressive power lens according to claim 7, wherein when $0 \leq r \leq r_0$, $g(r)$ and $h(r)$ satisfy the relationship of $g(0)=0$ and $h(0)=0$, and when $r_0<r$, $g(r)$ and $h(r)$ satisfy the following equations (6) and (7):

$$g(r) = \sum_{n} G_n \cdot (r - r_0)^n \qquad (6)$$

$$h(r) = \sum_{n} H_n \cdot (r - r_0)^n \qquad (7)$$

where $G_n$ and $H_n$ are coefficients for determining $g(r)$ and $h(r)$, which are constants not depending on r for a certain progressive refractive surface; and n is an integer of 2 or more.

11. A progressive power lens according to claim 10, wherein said $r_0$ is 7 mm or more and less than 12 mm.

12. A progressive power lens according to claim 7, wherein said progressive refractive surface is provided on the eye side.

13. A progressive power lens characterized in that
at least one of two refractive surfaces forming a spectacle lens has a progressive refractive surface including a distance portion and a near portion having different focal powers, and a progressive portion having a focal power progressively changed between said distance and near portions;
coordinates are defined such that, assuming that said progressive refractive surface of the lens assembled in each of spectacles is viewed from the front side of a user, the horizontal direction is taken as an X-axis; the vertical direction (direction between said distance and near portions) is taken as a Y-axis; the depth direction is taken as a Z-axis; and a progressively change starting point located at the lower end of said distance portion is taken as an origin (x, y, z)=(0, 0, 0);
assuming that a radial curvature of an original progressive refractive surface is taken as $c_p$ and a radial curvature of said progressive refractive surface is taken as $c_t$, a relationship of $c_t = c_p + \delta$ is established; and
at said distance portion along a main meridian line extending substantially in the Y-axis direction of said progressive refractive surface, said $\delta$ is given by $\delta = g(r)$;
at said near portion along the main meridian line extending substantially in the Y-axis direction of said progressive refractive surface, said $\delta$ is given by $\delta = h(r)$; and
at other portions, said $\delta$ is given by $\delta = \alpha \cdot g(r) + \beta \cdot h(r)$ where $\alpha$ and $\beta$ satisfy the relationship of $\alpha + \beta = 1.0$, $0 \leq \alpha \leq 1$, and $0 \leq \beta \leq 1$; r is a distance from said progressively change starting point and is expressed by $r = (x^2 + y^2)^{1/2}$; and said g(r) and h(r) are each a function depending only on r and satisfy the relationship of $g(r) \neq h(r)$ and $g(0) = 0$.

14. A progressive power lens according to claim 13, wherein an angle formed between a straight line extending from the progressively change starting point to the outer peripheral portion of said progressive refractive surface and said X-axis is taken as w, said $\alpha$ and $\beta$ satisfy the following equations (4) and (5):

$$\alpha = 0.5 + 0.5 \sin(w) \tag{4}$$

$$\beta = 0.5 - 0.5 \sin(w) \tag{5}$$

15. A progressive power lens according to claim 13, wherein said g(r) and h(r) satisfy the following equations (6) and (7):

$$g(r) = \sum_n G_n \cdot (r - r_0)^n \tag{6}$$

$$h(r) = \sum_n H_n \cdot (r - r_0)^n \tag{7}$$

where $G_n$ and $H_n$ are coefficients for determining g(r) and h(r), which are constants not depending on r for a certain progressive refractive surface; and n is an integer of 2 or more.

16. A progressive power lens according to claim 13, wherein when $0 \leq r \leq r_0$, g(r) and h(r) satisfy the relationship of $g(0) = 0$ and $h(0) = 0$, and when $r_0 < r$, g(r) and h(r) satisfy the following equations (6) and (7):

$$g(r) = \sum_n G_n \cdot (r - r_0)^n \tag{6}$$

$$h(r) = \sum_n H_n \cdot (r - r_0)^n \tag{7}$$

where $G_n$ and $H_n$ are coefficients for determining g(r) and h(r), which are constants not depending on r for a certain progressive refractive surface; and n is an integer of 2 or more.

17. A progressive power lens according to claim 16, wherein said $r_0$ is 7 mm or more and less than 12 mm.

18. A progressive power lens according to claim 13, wherein said progressive refractive surface is provided on the eye side.

19. A progressive power lens characterized in that
at least one of two refractive surfaces forming a spectacle lens has a progressive refractive surface including a distance portion and a near portion having different focal powers, and a progressive portion having a focal power progressively changed between said distance and near portions;
coordinates are defined such that, assuming that said progressive refractive surface of the lens assembled in each of spectacles is viewed from the front side of a user, the horizontal direction is taken as an X-axis; the vertical direction (direction between said distance and near portions) is taken as a Y-axis; the depth direction is taken as a Z-axis; and a progressively change starting point located at the lower end of said distance portion is taken as an origin (x, y, z)=(0, 0, 0);
assuming that a coordinate of an original progressive refractive surface is taken as $z_p$, and a coordinate of said progressive refractive surface is taken as $z_t$, a relationship expressed by the following equation (2) using $b_p$ defined by the following equation (1) is established;

$$b_p = \frac{2 z_p}{x^2 + y^2 + z_p^2} \tag{1}$$

$$z_t = \frac{(b_p + \delta) r^2}{1 + \sqrt{1 - (b_p + \delta)^2 r^2}} \tag{2}$$

at said distance portion along a main meridian line extending substantially in the Y-axis direction of said progressive refractive surface, said $\delta$ is given by $\delta = g(r)$;
at said near portion along the main meridian line extending substantially in the Y-axis direction of said progressive refractive surface, said $\delta$ is given by $\delta = h(r)$; and
at other portions, said $\delta$ is given by $\delta = \alpha \cdot g(r) + \beta h(r)$ where $\alpha$ and $\beta$ satisfy the relationship of $\alpha + \beta = 1.0$, $0 \leq \alpha \leq 1$, and $0 \leq \beta \leq 1$; r is a distance from said progressively change starting point and is expressed by $r = (x^2 + y^2)^{1/2}$; and said g(r) and h(r) are each a function depending only on r and satisfy the relationship of $g(r) \neq h(r)$ and $g(0) = 0$.

20. A progressive power lens according to claim 19, wherein an angle formed between a straight line extending from the progressively change starting point to the outer peripheral portion of said progressive refractive surface and said X-axis is taken as w, said α and β satisfy the following equations (4) and (5):

$$\alpha = 0.5 + 0.5 \sin(w) \quad (4)$$

$$\beta = 0.5 - 0.5 \sin(w) \quad (5).$$

21. A progressive power lens according to claim 19, wherein said g(r) and h(r) satisfy the following equations (6) and (7):

$$g(r) = \sum_n G_n \cdot (r - r_0)^n \quad (6)$$

$$h(r) = \sum_n H_n \cdot (r - r_0)^n \quad (7)$$

where $G_n$ and $H_n$ are coefficients for determining g(r) and h(r), which are constants not depending on r for a certain progressive refractive surface; and n is an integer of 2 or more.

22. A progressive power lens according to claim 19, wherein when $0 \leq r \leq r_0$, g(r) and h(r) satisfy the relationship of g(0)=0 and h(0)=0, and when $r_0 < r$, g(r) and h(r) satisfy the following equations (6) and (7):

$$g(r) = \sum_n G_n \cdot (r - r_0)^n \quad (6)$$

$$h(r) = \sum_n H_n \cdot (r - r_0)^n \quad (7)$$

where $G_n$ and $H_n$ are coefficients for determining g(r) and h(r), which are constants not depending on r for a certain progressive refractive surface; and n is an integer of 2 or more.

23. A progressive power lens according to claim 22, wherein said $r_0$ is 7 mm or more and less than 12 mm.

24. A progressive power lens according to claim 19, wherein said progressive refractive surface is provided on the eye side.

25. A progressive power lens characterized in that
at least one of two refractive surfaces forming a spectacle lens is configured as a progressive refractive surface including a distance portion and a near portion having different focal powers, and a progressive portion in which a focal power is progressively changed between said distance and near portions;
coordinates are defined such that, assuming that said progressive refractive surface of the lens assembled in each of spectacles is viewed from the front side of a user, the horizontal direction is taken as an X-axis; the vertical direction (direction between said distance and near portions) is taken as a Y-axis; the depth direction is taken as a Z-axis; and a progressively change starting point located at the lower end of said distance portion is taken as an origin (x, y, z)=(0, 0, 0);
assuming that a coordinate of an original progressive refractive surface is taken as $z_p$, and a coordinate of said progressive refractive surface is taken as $z_t$, a relationship expressed by the following equation (3) using $b_p$ defined by the following equation (1) is established;

$$b_p = \frac{2z_p}{x^2 + y^2 + z_p^2} \quad (1)$$

$$z_t = \frac{b_p r^2}{1 + \sqrt{1 - (1 + \delta)b_p^2 r^2}} \quad (3)$$

at said distance portion along a main meridian line extending substantially in the Y-axis direction of said progressive refractive surface, said δ is given by δ=g(r);
at said near portion along the main meridian line extending substantially in the Y-axis direction of said progressive refractive surface, said δ is given by δ=h(r); and
at other portions, said δ is given by δ=α·g(r)+β·h(r) where α and β satisfy the relationship of α+β=1.0, $0 \leq \alpha \leq 1$, and $0 \leq \beta \leq 1$; r is a distance from said progressively change starting point and is expressed by r=$(x^2+y^2)^{1/2}$; and said g(r) and h(r) are each a function depending only on r and satisfy the relationship of g(r)≠h(r) and g(0)=0.

26. A progressive power lens according to claim 25, wherein an angle formed between a straight line extending from the progressively change starting point to the outer peripheral portion of said progressive refractive surface and said X-axis is taken as w, said a and B satisfy the following equations (4) and (5):

$$\alpha = 0.5 + 0.5 \sin(w) \quad (4)$$

$$\beta = 0.5 - 0.5 \sin(w) \quad (5).$$

27. A progressive power lens according to claim 25, wherein said g(r) and h(r) satisfy the following equations (6) and (7):

$$g(r) = \sum_n G_n \cdot (r - r_0)^n \quad (6)$$

$$h(r) = \sum_n H_n \cdot (r - r_0)^n \quad (7)$$

where $G_n$ and $H_n$ are coefficients for determining g(r) and h(r), which are constants not depending on r for a certain progressive refractive surface; and n is an integer of 2 or more.

28. A progressive power lens according to claim 25, wherein when $0 \leq r \leq r_0$, g(r) and h(r) satisfy the relationship of g(0)=0 and h(0)=0, and when $r_0 < r$, g(r) and h(r) satisfy the following equations (6) and (7):

$$g(r) = \sum_n G_n \cdot (r - r_0)^n \quad (6)$$

$$h(r) = \sum_n H_n \cdot (r - r_0)^n \quad (7)$$

where $G_n$ and $H_n$ are coefficients for determining g(r) and h(r), which are constants not depending on r for a certain progressive refractive surface; and n is an integer of 2 or more.

29. A progressive power lens according to claim 28, wherein said $r_0$ is 7 mm or more and less than 12 mm.

30. A progressive power lens according to claim 25, wherein said progressive refractive surface is provided on the eye side.

* * * * *